Aug. 19, 1941.    R. A. SHARP    2,253,353
AWNING FOR AUTOMOTIVE VEHICLE WINDSHIELDS AND THE LIKE
Filed Aug. 21, 1939    2 Sheets-Sheet 1

Inventor:
Roy A. Sharp
By Whitehead & Vogl
Per Earle Whitehead
Attorneys

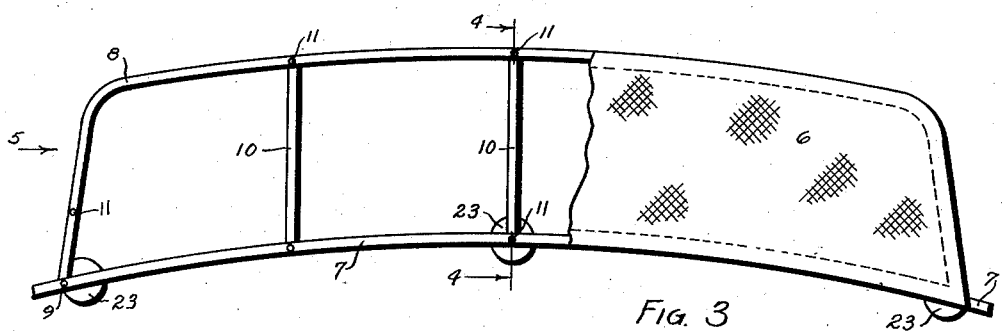
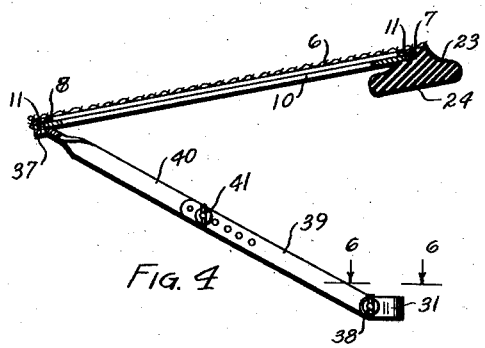 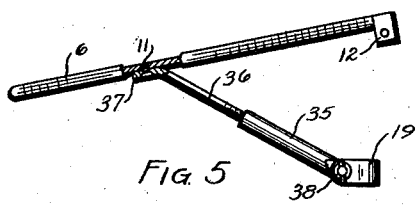
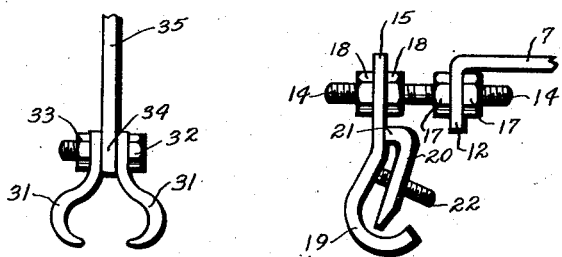 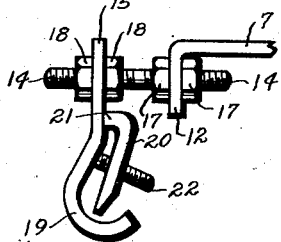 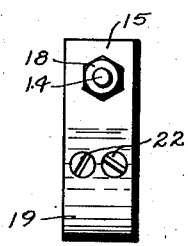
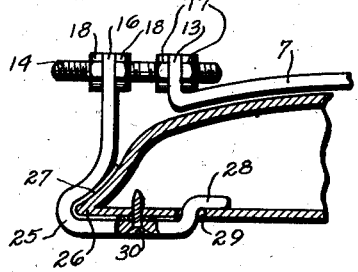

Patented Aug. 19, 1941

2,253,353

UNITED STATES PATENT OFFICE 2,253,353

AWNING FOR AUTOMOTIVE VEHICLE WINDSHIELDS AND THE LIKE

Roy A. Sharp, Denver, Colo.

Application August 21, 1939, Serial No. 291,214

3 Claims. (Cl. 296—95)

This invention relates to awnings for automotive vehicle windshields and the like.

An object of the present invention is to provide, for automotive vehicle windshields and the like, an awning which, without obstruction of the driver's view, will protect the occupants of the car from both light and heat rays of the sun and from the glare of artificial lights, and shall also, at least to a substantial degree, protect the windshield from sleet, snow, and rain but which shall offer a minimum of resistance to wind pressure while the automotive vehicle is in motion and which shall be adjustable to meet varying conditions of light, weather, and the height of the eyes of the driver.

A further object of the invention is the provision of simple, substantial and secure means for the attachment of such an awning to an automotive vehicle and for the easy and ready detachment thereof from such vehicle.

A further object is the provision of such an awning and fastening means in such a manner that the same will be amply substantial to withstand wind pressures and other strains and stresses under constant use, and which shall at the same time be simple and economical in construction, attachment and adjustment.

With these and other objects in view, as will hereafter more fully appear, the invention comprises certain novel combinations, constructions and arrangements of parts as will be hereinafter described and claimed and as illustrated in the accompanying illustrative drawings in which Fig. 1 is a view of a fragment of the front of an automobile, illustrating my improved awning in position over the windshield.

Fig. 3 is a plan of the awning, minus the attaching and adjusting means, the covering of the awning being partly broken away to disclose the framework in full lines.

Fig. 4 is a section on line 4—4 of Fig. 3 illustrating one form of adjusting brace.

Fig. 5 is an elevation of the edge of the awning and its adjustable supporting brace, the brace being of a different form than that illustrated in Fig. 4.

Fig. 6 is a view on line 6—6 of Fig. 4.

Fig. 7 is a detail view of one form of fastening means used at the ends of the awning.

Fig. 8 is a side elevation of the fastening means illustrated at Fig. 7.

Fig. 9 illustrates another embodiment of the fastening means adapted to a different eaves structure.

Figure 1:
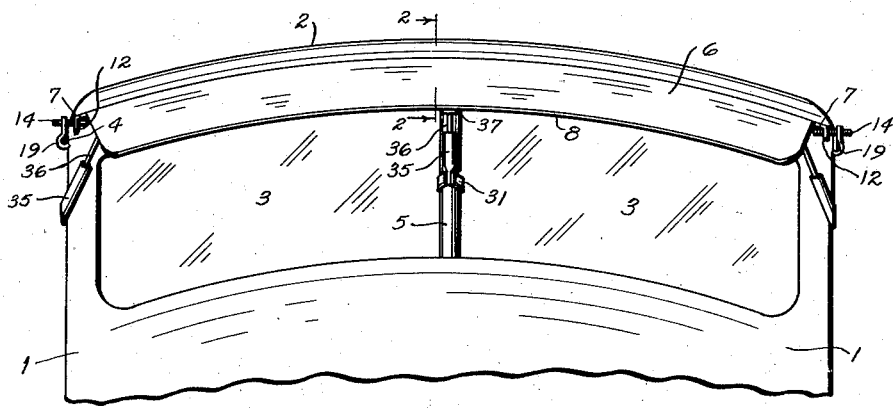

The increasing majority of automotive windshields are sloped in accordance with the streamlined designs. This sloping of the windshields subjects the driver and other occupants of the front seat of the automobile to the direct glare and heat of the sun's rays, resulting in inconvenience to the occupants both as to glare and temperature, and danger to the occupants from the glare in the eyes of the driver.

The sloping windshields and the increased speed of automotive vehicles also result in large volumes of air passing upwardly over the windshield and over the top of the car. Under such conditions if an ordinary awning be solidly attached to the car at the top of the windshield, a terrific air pressure would be exerted upon the under side of the awning and the outside of the windshield, resulting not only in substantial air resistance to the movement of the car but also in danger of displacement of or damage to the awning, unless so heavily constructed as to add materially to its expense, difficulty of adjustment and unsightliness.

Generally stated, the purpose of the present invention is to provide an awning which will protect the occupants of the front seat from the inconveniences and dangers above indicated and which can be easily adjusted as desired, and which will so provide, in regard to wind pressure, that the awning may be of a comparatively light, economical, and attractive structure and appearance.

Referring to the accompanying illustrative drawings, the front portion of an automotive vehicle is indicated at 1, having a roof 2, a sloping windshield 3 and a rain-drip molding 4, the windshield being provided with the usual central division member 5.

The awning member itself may be constructed of various materials and in various forms, and in the drawings I have illustrated a preferred embodiment formed of a metal frame generally illustrated at Fig. 3, with a covering of any suitable material indicated at 6. The frame is preferably composed of a base member 7 of contour generally conforming to the upper portion of the body of the automotive vehicle, above but adjacent the windshield.

The outer member 8 of the frame may be of any suitable contour, its ends being connected to the brace member 7 as at 9, suitable intermediate bracing members 10 being placed between the base member 7 and the outer member 8 and affixed thereto by any suitable means generally indicated at 11.

The ends of the base member 7 are bent downwardly, as indicated at 12 in Figs. 1 and 7 for one type of fastening, or upwardly as indicated at 13 in Fig. 9 illustrating a different embodiment of the fastening member.

Both embodiments of the fastening member illustrated, respectively, in Figs. 1, 7 and 8, and 9, comprise a threaded bar 14 adapted to pass through suitable orifices (not shown) in the bent ends 12 or 13 of the member 7 and like orifices in the eaves-clamping member 15 or 16 later described. The members 12 or 13 and 15 or 16 are locked in desired interrelative position on the bar 14 by two pairs of locknuts 17 and 18.

The eaves clamp in the embodiment illustrated in Figs. 1, 7 and 8 comprises a hook 19 depending from the member 15 and adapted to catch under the rain-drip molding 4. To securely hold the hook 19 in engagement with the molding 4 I provide a cleat 20 having a lug 21 adapted to seat against the member 15, the cleat 20 being provided with suitable threaded orifices to receive screws 22, the heads of which seat in the upper portion of the hook 19, as clearly illustrated at Figs. 7 and 8. The hook 19 engages the outside of the rain-drip molding and the cleat 20 engages the inside of such molding, and by the screws 22 the cleat 20 and the hook 19 may be drawn together into clamping engagement with the edge of the molding 4, the point of the cleat 20 projecting nearly to the bottom of the inside of the molding, whereby the hook 19 is held securely to the molding.

By suitable means, as by the contour of member 7 or by the length of members 12 and 15 in the one embodiment and 13 and 16 in the other embodiment of the fastening means, base member 7 is spaced or permitted to be spaced away from the roof of the car adjacent the top of the windshield, and in order to maintain such spacing without damage to the surface of the car body and likewise for the purpose of providing a resilient but secure fastening of the base member 7 to the car, I provide resilient pads 23 of suitable material, such as rubber, which pads are suitably attached to the under side of the base member 7 and rest, with a comparatively broad base 24, upon the outer surface of the car body, beneath the member 7, whereby a space between the car body and the base member 7 is maintained, and by reason of the resilience of the members 23 the fastening of the awning to the molding 4 is made more secure than it would be with a correspondingly light but rigid structure. The resilience of pads 23 also permits variation in relation of the base 7 to the vehicle body resulting from adjustment of the awning.

The embodiment of the fastening as illustrated in Fig. 9 differs from the above-described embodiment in that the end 13 of the base member 7 is turned upwardly instead of downwardly, and in place of the hook 19 and associated parts I provide a hook 25 conforming to the projecting eaves 26 of the roof of the car, providing between the hook and the eaves a suitable pad 27 and providing at the end of the hook an offset lug 28, adapted to be inserted through a hole 29 formed in the under side of the eaves of the car, the base of the hook 25 being further secured to the eaves by suitable means, as screw 30.

Centrally of the awning I provide an adjustable brace assembly comprising a pair of hooks 31 adapted to engage the opposite sides of the windshield division-member 5 and to be clamped thereto by bolt 32 having nut 33, the flattened end 34 of member 35 being pierced by the bolt 32 and clamped between the shanks of the hooks 31, all as clearly illustrated at Fig. 6.

Adjustably co-mating, as by a threaded connection, with member 35 is a member 36, the outer end of which is attached in any suitable manner to the underside of member 8, as at 37. The attachment at 37 may be of any suitable kind, as for example by screw connection of the same type as illustrated in the portion broken away at Fig. 5.

The ends of the awning may be adjustably braced from the downward extension 4a of the rain-drip molding, as illustrated at right and left in Fig. 1 and as illustrated in detail at Fig. 5. In this case the structure is the same as that above described for the central adjustable brace, except that the fastening illustrated at Figs. 7 and 8 is used instead of the fastening illustrated at Fig. 6, the member 35 being attached to the shank 15 of the hook 19 by any suitable bolt and nut structure generally indicated at 38.

To adjust the braces of the above-described structure at either the center or the ends of the awning, the brace may be detached from the awning at 37 and member 36 rotated on its threaded connection with the member 35, or member 35 may be disengaged from the fastening 19 or the fastening 19 disengaged from the molding 4a and the member 35 rotated on its threaded connection with the member 36. Either operation will lengthen or shorten the adjustable brace member according to the direction of rotation. It will be understood that, during such adjustment, nuts 17 are loosened sufficiently to permit the bent ends 12 or 13 of member 7 to move rotatively on bar 14.

A different embodiment of bracing member is illustrated at Fig. 4, where flat, overlapping, orificed members 39 and 40 are interconnected by thumb screw or other suitable means, as indicated at 41, the outer ends of each of the members 39 being connected with the clamp or hooks illustrated in Figs. 6 and 7, as generally indicated at 38, and the outer end of member 40 being connected with the awning frame, as at 37, in the same manner as the connections hereinabove respectively described for the other embodiment of adjustable brace.

Figure 2:
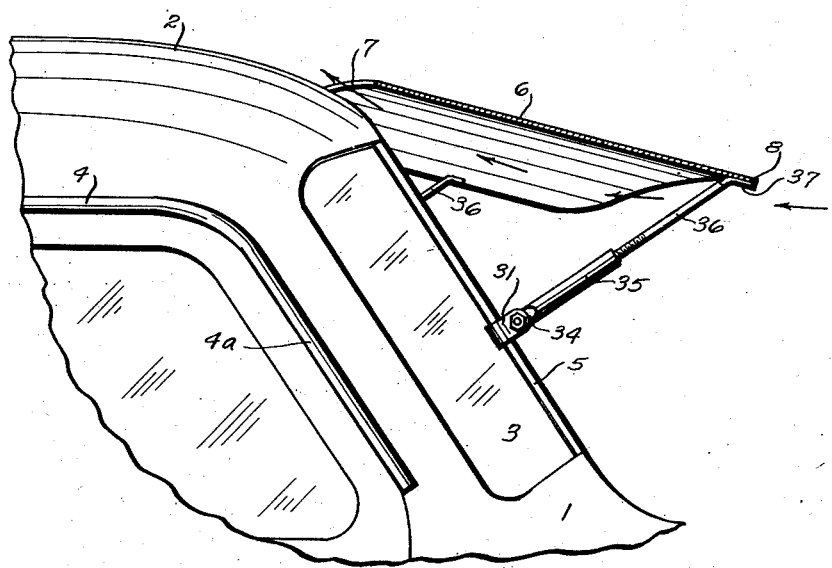
Fig. 2 is a side view of the same, the awning being shown in section on line 2—2 of Fig. 1.

From the foregoing description, as illustrated in the drawings, it will be seen that I have provided an awning which will protect the occupants of the front seat of an automobile having a slanted windshield from both the glare and the heat of the sun's rays; that the same may be readily attached to and detached from automotive vehicles; that the same may be adjusted upwardly or downwardly to meet varying conditions; that suitable provision is made regarding air which would otherwise accumulate beneath and press upwardly against such an awning, but which, with this structure, passes under the awning and between the awning and the roof of the car as indicated by the arrows at Fig. 2, and that the structure is simple, economical, substantial, and durable. Obviously, also, this awning will serve to keep rain and snow from falling upon the windshield while the car is at rest.

While I have hereinabove described, and in the drawings have illustrated many details of construction, modifications thereof or other structures mechanically equivalent to those thus described and illustrated will be obvious to those skilled in the art and I am not to be limited to the details of construction illustrated or described.

I claim:

1. In an awning structure for automotive vehicle windshields having a shield with a base adapted for mounting adjacent, and substantially conforming in shape to, the vehicle roof above the top of the windshield, the shield extending from said base forwardly over the windshield and said base being attached to but spaced above the roof, means for pivotally attaching the shield to the vehicle body comprising a hook adapted to engage a projection on the vehicle body and having an orificed shank, a bent and orificed projection from the end of the base, a threaded member seated in the orifices of the shank and bent projection and carrying pairs of nuts whereby to adjustably interengage the bent projection to the shank.

2. In an awning structure for automotive vehicle windshields having a shield with a base adapted for mounting adjacent, and substantially conforming in shape to, the vehicle roof above the top of the windshield, the shield extending from said base forwardly over the windshield and said base being attached to but spaced above the roof, means for attaching the shield to the vehicle body having a rain drip molding, including a hook adapted to engage the outside of said molding and a cleat adjustably attached to the shank of the hook and adapted to project inside the molding whereby the hook may be gripped to the molding by the cleat.

3. In an awning structure, for automotive vehicle windshields divided by a central member, having a shield with a base adapted for mounting adjacent, and substantially conforming in shape to, the vehicle roof adjacent the top of the windshield, the shield extending from said base forwardly over the windshield, the base having its ends pivoted in brackets attached at the sides of the vehicle body but being spaced above the roof and having longitudinally adjustable braces connecting the vehicle and the edges of the shield, a longitudinally adjustable brace having pivoted to one end a double-jawed clamp adapted to be clamped to said central division member and to the brace by a single means, the other end of said brace engaging said shield near its forward edge.

ROY A. SHARP.